United States Patent [19]

Coghill et al.

[11] 4,306,368

[45] Dec. 22, 1981

[54] VISUAL COMMUNICATIONS DEVICE FOR USE BY HANDICAPPED PERSONS

[75] Inventors: Davis G. Coghill, 4907 Glacia Dr., Los Angeles, Calif. 90041; Raoul H. De Gaston, Southgate, Calif.

[73] Assignee: Davis G. Coghill, Los Angeles, Calif.

[21] Appl. No.: 159,937

[22] Filed: Jun. 16, 1980

[51] Int. Cl.³ .................. G09F 11/04; G09B 3/00; G01D 13/22; G09F 9/00

[52] U.S. Cl. .................. 40/496; 40/481; 40/495; 434/112; 434/206; 116/301; 116/316; 74/161; 74/129

[58] Field of Search ............... 116/311, 312, 315, 319, 116/328, 329, 284, 285, 300, 301, 316; 40/496, 498, 495, 112, 115, 113, 481, 485, 497; 273/142 J, 142 D, 142 JC; 434/404, 112, 176, 206, 402, 403, 113–117; 74/129, 161; 235/121, 120

[56] References Cited

U.S. PATENT DOCUMENTS

| | | | |
|---|---|---|---|
| 48,607 | 7/1865 | Washburn | 74/161 |
| 209,458 | 10/1878 | Carlsen | 40/112 |
| 410,967 | 9/1889 | Giroud | 116/301 |
| 514,345 | 2/1894 | Beaumont | 40/498 |
| 599,364 | 2/1898 | Smith et al. | 235/121 |
| 908,503 | 1/1909 | Sanders | 235/121 |
| 1,030,786 | 6/1912 | Manchester | 235/121 |
| 1,348,852 | 8/1920 | Diaz | 40/495 |
| 1,519,480 | 12/1924 | Biggs | 40/496 |
| 1,676,410 | 7/1928 | Paul | 434/404 |
| 1,751,270 | 3/1930 | Eifel | 40/498 |
| 2,595,980 | 5/1952 | Neubauer et al. | 116/316 |
| 2,875,621 | 3/1959 | Peters | 74/161 |
| 2,942,486 | 6/1960 | Beguin | 74/129 |
| 3,128,099 | 4/1964 | Stan | 273/142 JC |

*Primary Examiner*—G. E. McNeill
*Assistant Examiner*—Michael J. Foycik
*Attorney, Agent, or Firm*—Fulwider, Patton, Rieber, Lee & Utecht

[57] ABSTRACT

A communications device including a display panel having a plurality of symbols arrayed thereon in a circle, each of the symbols indicating a particular idea to be communicated, and a pointer projecting radially from the center of the circle. An indexing mechanism is provided for producing incremental relative rotational movement between the pointer and the display to cause the pointer to be aligned with the next successive one of the symbols upon receiving a single manual input. Preferably, there are two display panels facing in opposite directions and a pointer corresponding to each panel. Each symbol on one panel has counterpart on the other and the pointers move in synchronization.

7 Claims, 4 Drawing Figures

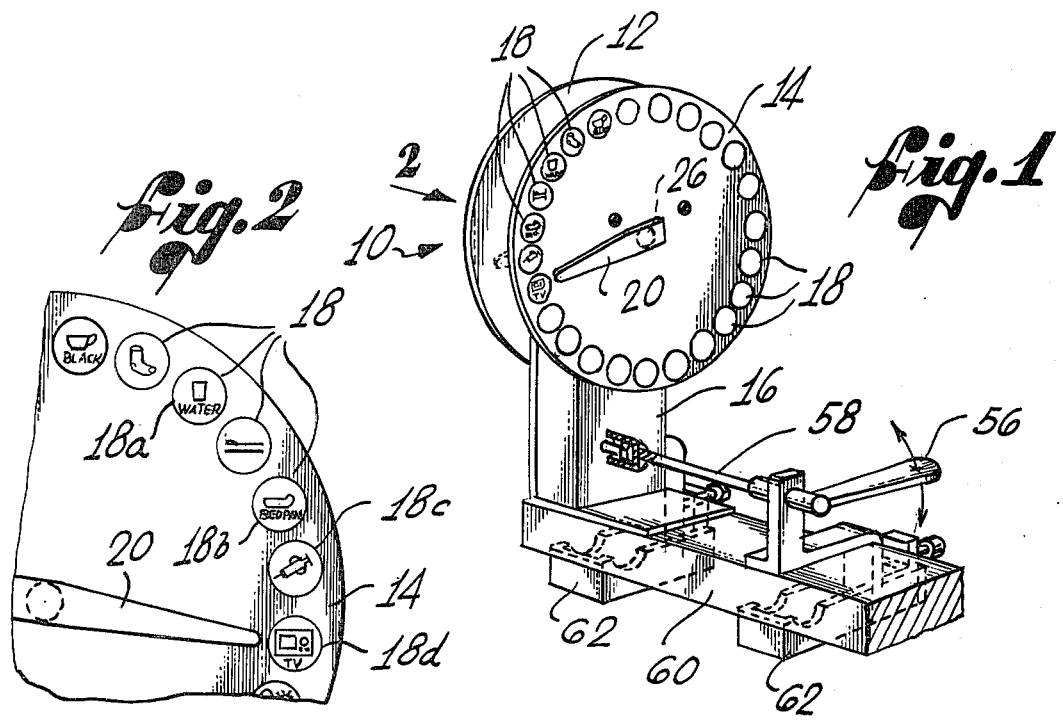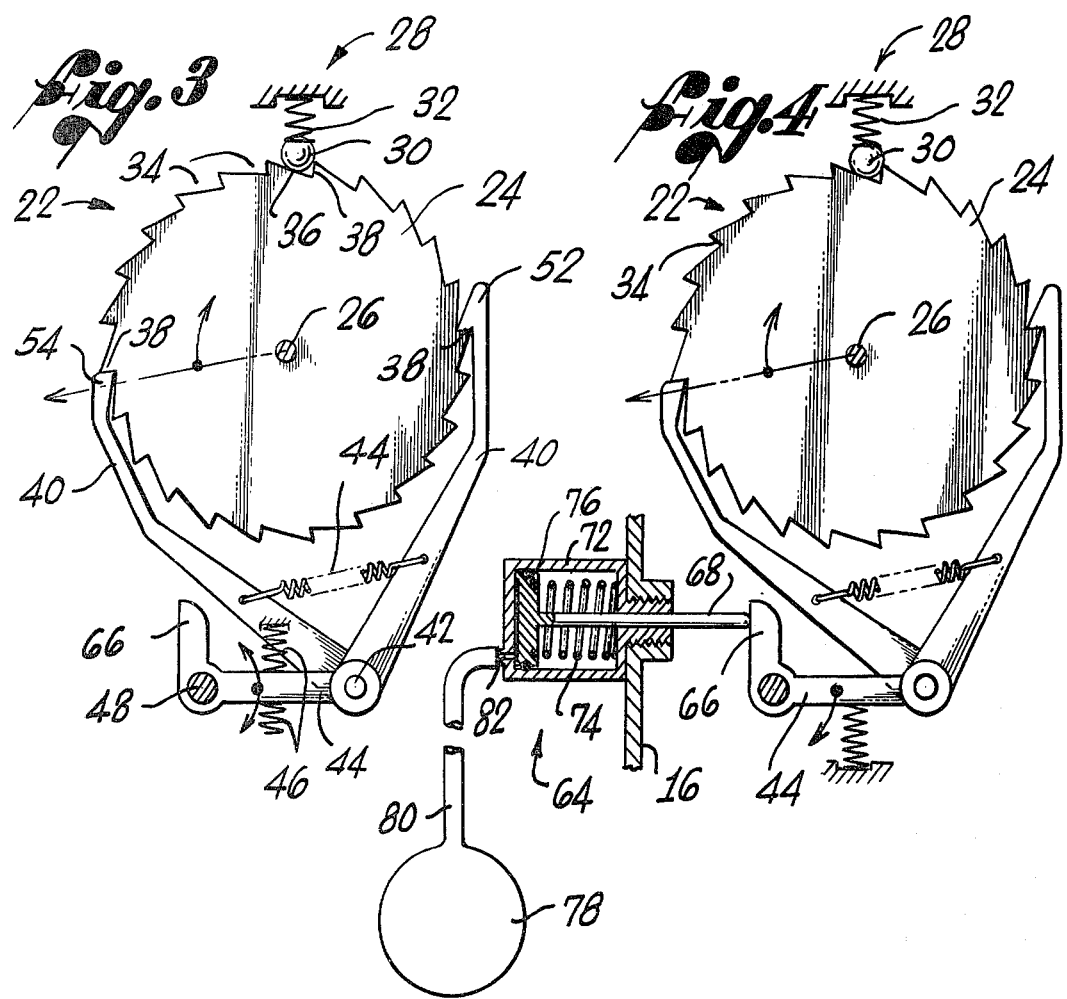

VISUAL COMMUNICATIONS DEVICE FOR USE BY HANDICAPPED PERSONS

FIELD OF THE INVENTION

The present invention relates to a communications device, and, more particularly, to a visual communication device which is particularly suitable for use by handicapped persons.

BACKGROUND OF THE INVENTION

Severely handicapped persons often have considerable difficulty communicating simple ideas associated with their daily lives. This is particularly true in the instance of persons who are both physically and mentally handicapped. These persons are frequently unable to use speech in an intelligible manner.

While a number of electronic communications devices have been developed for persons who have greater mental capacity, these devices are generally unsuitable for persons who cannot cope with the abstract concepts involved in their use. These concepts would incorporate, for example, the idea of scanning to bring the device to rest in a mode in which it displays the desired signal. Other such devices require that various input signals be combined to produce a single output.

An objective of the present invention is to provide a greatly simplified communications device that nevertheless provides a handicapped person with the ability to communicate simple ideas effectively.

A further objective is provide such a device that is extremely durable, making it suitable for use by persons who will not be careful to avoid damaging it. Still another objective is to provide such a device that does not require electrical power so that it will be safe and will not require replacement of batteries.

SUMMARY OF THE INVENTION

The present invention accomplishes the above objectives by providing a communications device that includes a display panel having a plurality of symbols arranged thereon in a circle. Each symbol indicates a particular idea to be communicated, such as a need for a drink of water, a request that a television set be turned on, or a desire to go to bed. The availability of these symbols may enable a severly handicapped person to communicate to limit of his or her mental ability.

A pointer projects radially from the center of the circle in alignment with a selected one of the symbols. To move the pointer, an indexing mechanism is provided for producing incremental relative rotational movement between the pointer and the display panel to cause the pointer to be aligned with the next successive symbol upon receiving a single manual input.

A preferred form of indexing mechanism includes a lever that can be moved pivotally in either of two directions and a drive mechanism that produces relative movement between the pointer and the display panel in a single predetermined direction upon movement of the lever in either of its two directions. This can be accomplished by a ratchet wheel to which the pointer is attached and a pair of pawls connected to the lever and engagable with opposite sides of the wheel.

A particularly desirable form of the invention includes two parallel display panels facing in opposite directions, a set of symbols being provided on each panel. There is also a pointer for each panel and the indexing mechanism moves the pointers in synchronization. The pointers are arranged so that they point to similar symbols that are counterparts of each other.

The device is positioned so that the user can see one panel and operates the indexing mechanism until the pointer on that panel indicates the desired symbol. At all times, the pointer on the opposite panel indicates the corresponding symbol which can be read by another person for whom the message is intended. This permits the two persons involved in the communication to face each other, while both of them can conveniently see the device and known which symbol is indicated.

Other features and advantages of the present invention will become apparent from the following detailed description taken in conjunction with the accompanying drawings, which illustrate, by way of example, the principles of the invention.

BRIEF DESCRIPTION OF THE DRAWING

FIG. 1 is a pictorial illustration of a communications device constructed in accordance with the present invention;

FIG. 2 is an enlarged front elevation of a fragmentary portion of a display panel and a pointer of the device of FIG. 1;

FIG. 3 is a schematic illustration of the internal indexing mechanism of the device of FIG. 1; and FIG. 4 is similar to FIG. 3, showing the indexing mechanism in combination with a pneumatic actuator.

DETAILED DESCRIPTION

A communications device 10 constructed in accordance with the present invention, and shown in FIG. 1 of the drawings, includes a pair of parallel, disc-like display panels 12 and 14. A housing 16 on which the panels 12 and 14 are mounted is positioned between them and the panels face in opposite directions.

Arrayed about the periphery of each panel 12, 14 is a plurality of evenly spaced symbols 18 arranged in a circle, as best shown in FIGS. 1 and 2. Each of the symbols 18 corresponds to a single complete idea to be communicated. For example, there may be a symbol 18a indicating a desire for a glass of water, a symbol 18b indicating a desire to go to bed, a symbol 18c indicating a desire for medication, and a symbol 18d indicating a desire to watch television.

A pair of pointers 20 is provided, each being rotatable about the center of one of the circular rays of symbols 18. Within the housing 16 is an indexing mechanism 22, best shown in FIG. 3. The indexing mechanism 22 includes a ratchet wheel 24 to which both pointers 20 are attached at the center by a shaft 26. The two pointers 20 and the ratchet wheel 24 are locked to the shaft 26 in such a manner that they rotate in synchronization and the relative position of the two pointers 20 does not change.

A detent mechanism 28 consists of a ball 30 and a spring 32 arranged so that the spring forces the ball against the circumferential edge of the ratchet wheel 24. A plurality of notches 34 are formed on the edge of the wheel 24, there being one notch corresponding to each of the symbols 18. Since the spring 32 will always force the ball 30 into one of the notches 34, the ratchet wheel 24 will at all times assume a position in which the pointers 20 are directly aligned with a pair of counterpart symbols 18. In other words, the same message is always communicated on both sides of the device 10.

Upon the application of sufficient torque to the ratchet wheel 24, the ball 30 rises against the force of the spring 32 and the wheel 24 rotates in discrete incremental steps. However, the notches 34 are not symmetrical, each notch having one gently sloped side 36 and one steep side 38. Although the sloped side 36 will raise the ball 30 if the rotation is in the proper direction, the steep side 38 will merely press against the ball and resist movement if a rotational force is applied in the opposite direction. The device 10 is, therefore, unidirectional.

Rotation of the ratchet wheel 24 is caused by either of two pawls 40 arranged in a V-shaped configuration. The pawls 40 are commonly secured at their lower ends to a pin 42, the pawls being pulled toward each other and against the opposite sides of the ratchet wheel 24 by a spring 44 held in tension between them.

The pin 42 is rotatably journaled in the end of a horizontal arm 44. A pair of springs 46 bias the arm 44 toward its neutral horizontal position, the arm being pivoted at its end opposite the pin 42 on a shaft 48. The arm 44 is secured to the shaft 48 in such a way that it cannot rotate relative to the shaft. Thus, if the shaft 48 is rotated through a small number of degrees in one direction (clockwise as shown in FIG. 3), the arm 44 will pivot so as to move the pin 42 downwardly, pulling the two pawls 40 downwardly. On the other hand, if the shaft 48 is rotated in the opposite direction (counterclockwise in FIG. 3), the pin 42 will be raised, causing the pawls 40 to move upwardly.

One of the two pawls 40 carries a hook-shaped upper end 52 which engages the steep side 38 of a notch 34 in the ratchet wheel 24 upon downward movement of the pin 42. The other pawl 40 has an abutment 54 on its top end that engages the steep side 38 of another notch 34 to cause rotation of the ratchet wheel 24 in the same clockwise direction when the pivot pin 42 is raised. Thus, it will be noted that rotation of the shaft 48 and arm 44 in either direction (clockwise or counterclockwise) will produce movement of the ratchet wheel 24 in the same predetermined direction (clockwise). The angle through which the arm 44 can move is such that it will permit the ratchet wheel 24 to move sufficiently to cause the ball 30 of the detent mechanism 28 to enter the next successive notch 34, thus bringing the pointers 20 that rotate with the wheel into alignment with the next successive symbols 18.

As shown in FIG. 1, an actuating lever 56 can be attached to the shaft 48 by an elongated rod 58 so that the indexing mechanism 22 can be operated from a convenient distance. In this case, the housing 16 and the rod 58 are conveniently mounted on the arm 60 of a chair (not shown) or other such support by a pair of clamps 62. In this arrangement, the user of the device 10 can cause movement of the pointers 20 by moving the lever 56 either up or down to rotate the shaft 48.

The simplicity of the operation of the device 10 will now be apparent. All that the user need do is produce any movement of the lever 56, and the two pointers 20 will jump to the next successive symbols 18. Since movement of the pointers 20 is always in the same direction, the user of the device 10 will not be frustrated by movement of the pointers 20 in one direction and then the other. The use of scanning is also avoided since it might be difficult or confusing, requiring timing to stop the pointers 20 at the desired locations. Instead, the user actuates the lever 56 again and again until the pointers 20 come to rest at the desired symbol 18, which it will inevitably do upon the repetition of any movement or series of movements that affect the lever. It is impossible, because of the detent mechanism 28, for the pointers 20 to come to rest in an ambiguous position in which they are not clearly aligned with a particular symbol 18.

The use of two oppositely facing display panels 12 and 14, each with its own set of symbols 18, is particularly advantageous, because it enables the user of the device 10 and the person with whom the user is communicating to be positioned facing each other with the device 10 between them. Each of them can easily see the device 10 and know the message being communicated.

Because of the manner in which the device 10 is actuated, it can be adapted for use by a person suffering any manner of physical handicap and virtually any type of movement can be caused to actuate it. As shown in FIG. 4, the lever 56 can be eliminated in favor of a pneumatic actuating device 64 suitable for a person who can produce a squeezing movement. In this case, a perpendicular wing 66 is integrally formed with the arm 44 and projects upwardly from the shaft 48. A push rod 68 is arranged for horizontal movement in such a manner that it engages the top end of the wing 66. At its opposite end, the push rod 68 is attached to a piston 70 that is reciprocable within a cylinder 72 and urged away from the wing 66 by a spring 74 disposed within the cylinder 72. A squeezable bulb 78 is connected by a flexible tube 80 to an air inlet 82, so that the squeezing of the bulb supplies a short burst of compressed air to the cylinder 72 on the side opposite the piston 76. This air pressure causes the piston 76 to move against the force of the spring 74, and the push rod 68, by acting against the wing 66, rotates the shaft 48 and the arm 44 through an angle sufficient to index the ratchet wheel 24.

While a particular form of the invention has been illustrated and described, it will be apparent that various modifications can be made without departing from the spirit and scope of the invention.

We claim:

1. A communication device for use by handicapped persons comprising:
   a plurality of symbols, each indicating a particular dissimilar non-sequential idea to be communicated, said symbols being evenly spaced from each other and arranged in a circle;
   a pointer rotatable about the center of said circle, whereby said pointer can be positioned in alignment with a selected one of said symbols; and
   indexing means for incrementally moving said pointer to the next successive one of said symbols upon receiving a single manual input, said indexing means including an actuating lever pivotable in either of two directions and producing movement of said pointer in a single predetermined direction upon movement of said lever in either of said two directions.

2. The device of claim 1 wherein said indexing means comprises:
   a ratchet wheel;
   an actuating lever pivotable in either of two directions; and
   a pair of pawls, connected to said lever and engageable with said ratchet wheel on opposite sides thereof.

3. The device of claim 2 wherein said indexing means further comprises detent means for inhibiting rotation of said pointer.

4. The device of claim 2 wherein said pointer is connected to said ratchet wheel for rotation therewith.

5. A communication device for use by handicapped persons comprising:
- a pair of parallel display panels each having a set of symbols thereon that are evenly spaced from each other and arranged in a circle, the symbols of each of said panels facing in a direction opposite to the symbols of the other of said panels, each of said symbols indicating a particular dissimilar nonsequential idea to be communicated, and each of said symbols on one of said panels having a counterpart on the other of said panels;
- a pair of pointers, each overlying one of said panels and each being rotatable about the center of one of said circles; and
- indexing means mounted between said panels for incrementally moving said pointers jointly to the next successive one of said symbols upon receiving a manual input comprising an actuating lever pivotable in either of two directions and producing movement of each of said pointers in a single predetermined direction upon movement of said lever in either of said two directions, said pointers being connected to said indexing means in such a manner that they point to symbols that are counterparts of each other.

6. The device of claim 5 wherein said indexing means further comprises a pair of pawls connected to said lever and a ratchet wheel engageable on opposite sides thereof by said pawls.

7. The device of claim 6 wherein said indexing means further comprises detent means for inhibiting rotation of said pointers.

* * * * *